United States Patent [19]
Waite et al.

[11] Patent Number: 5,222,134
[45] Date of Patent: Jun. 22, 1993

[54] SECURE SYSTEM FOR ACTIVATING PERSONAL COMPUTER SOFTWARE AT REMOTE LOCATIONS

[75] Inventors: David P. Waite, Fairfax; Horace G. Riddell, Chantilly, both of Va.

[73] Assignee: Tau Systems Corporation, Falls Church, Va.

[21] Appl. No.: 682,456

[22] Filed: Apr. 9, 1991

Related U.S. Application Data

[63] Continuation-in-part of Ser. No. 610,037, Nov. 7, 1990, Pat. No. 5,103,476.

[51] Int. Cl.⁵ .............................................. H04L 9/32
[52] U.S. Cl. .......................................... 380/4; 380/23; 380/25; 380/49
[58] Field of Search ...................................... 371/37, 7

[56] References Cited

U.S. PATENT DOCUMENTS

| | | | |
|---|---|---|---|
| 4,446,519 | 5/1984 | Thomas | 395/425 |
| 4,458,315 | 7/1984 | Uchenick | 380/4 |
| 4,593,353 | 7/1985 | Pickholtz | 380/4 |
| 4,597,058 | 6/1986 | Izumi et al. | 395/600 |
| 4,649,510 | 3/1987 | Schmidt | 380/4 |
| 4,652,990 | 3/1987 | Pailen et al. | 380/4 |
| 4,685,055 | 8/1987 | Thomas | 380/4 |
| 4,740,890 | 4/1988 | William | 395/575 |
| 4,791,565 | 12/1988 | Dunham et al. | 395/575 |
| 4,796,220 | 1/1989 | Wolfe | 380/4 |
| 4,924,378 | 5/1990 | Hershey et al. | 395/100 |
| 4,937,863 | 6/1990 | Robert et al. | 380/4 |
| 5,103,476 | 4/1992 | Waite et al. | 380/4 |

*Primary Examiner*—Bernarr E. Gregory
*Attorney, Agent, or Firm*—Hoffman, Wasson & Gitler

[57] ABSTRACT

A process and system for activating various programs are provided in a personal computer. The computer is initially provided with a registration shell. A data link is established between the personal computer and a registration computer. By providing the registration computer with various information, a potential licensee can register to utilize the program. Once the registration process is complete, a tamperproof overlay program is constructed at the registration computer and transferred to the personal computer. The tamperproof overlay includes critical portions of the main program, without which the main program would not operate and also contains licensee identification and license control data.

13 Claims, 4 Drawing Sheets

SECURE SYSTEM FOR ACTIVATING PERSONAL COMPUTER SOFTWARE AT REMOTE LOCATIONS

This is a continuation-in-part of copending application Ser. No. 07/610,037 filed on Nov. 7, 1990, now U.S. Pat. No. 5,103,476.

BACKGROUND OF THE INVENTION

Generally speaking, most users of personal computers or similar devices obtain additional computer software to run on their devices by purchasing this software in various retail outlets or by obtaining this additional software through the mail. In both situations, a "shrink-wrap" material encases the software product and a license agreement is implied by the removal of the shrink wrap material in an endeavor to protect the licensor of the product from unauthorized copying and use of the product by the licensee/purchaser. This method of doing business has proved to be inadequate for both the licensee and the licensor. For example, the licensee is not given an opportunity to initially operate the software program to determine whether this program would suit the licensee's needs. Additionally, from the licensor's point of view, identification of the licensee and a means of controlling or monitoring the use of the program by the licensee are not provided by this technique.

Software program protection schemes have been disclosed in U.S. Pat. No. 4,446,519, issued to Thomas, which involve including a programmed Go/No Go Test within the program to confirm the presence of a hardware or firmware security device installed on the computer to which the software is licensed. This technique is intended to ensure that copies of the program will not be utilized without the physical security device, which is much more difficult to duplicate than the software. Such techniques are easily defeated, however by discovering the correct coded response and providing it through a slight modification to the program. Once defeated, unlimited, defeated copies may be provided and distributed.

U.S. Pat. No. 4,740,890, issued to William, teaches the use of a central (remote) computer to provide unlocking codes or validation codes derived from master lists or algorithms inaccessible to the unscrupulous programmer who may attempt to derive the correct codes. However, the methods taught are easily detected by intercepting the transmitted code, by programming around the test, or by analyzing the program with a debugger program to inspect for the presence of a code which will allow execution of the program. Once the test is defeated, unlimited copies of the operable program may be produced and distributed.

Additionally, protection schemes for valuable computer programs have been taught which involve invalidating the most valuable algorithms, and only restoring such valuable algorithms by running the invalidated program in a processor while simultaneously running a restoration algorithm in a physically separate and protected processor, the valid result being obtained by the intercommunication of the two processes, which are described in U.S. Pat. No. 4,649,510, issued to Schmidt. Such techniques are dependent upon the physical protection of the restoration algorithm and could easily be defeated by an unscrupulous programmer if the physical security were breached. Therefore, such a scheme is impractical in a mass market where physical security of the restoration storage media cannot be maintained.

Consequently, an economical method for distributing software to a mass market while protecting the software from abuse by anonymous licensees is warranted. Furthermore, a method and system for allowing a potential purchaser/licensee to test a software program prior to purchasing the product is needed. Still further, a method for distributing enhancements, and updates to registered license is desirable.

BRIEF DESCRIPTION OF THE INVENTION

The present invention is directed to a method and a system for permitting personal computer software programs or other types of programs to be distributed in a license controlled manner. An operational program will be made available in a particular transaction between the purchaser/licensee and the seller/licensor. Although the relationship between the seller and the purchaser need not be a licensor/licensee agreement, for the purposes of the present invention, we will refer to the seller as the licensor and the purchaser as the licensee or user. Once the licensee agrees to the terms of the particular transaction, licensee identification data is provided to a registration computer. The registration computer records the transaction and provides the operational segments of the licensed program. These segments are both tamperproof and unique to the identified licensee. Based upon this exchange of information, the operational computer program is delivered to the registered licensee's computer in a tamperproof file that also includes licensee unique information.

Although various embodiments of the present invention may be envisioned, it is noted that all embodiments involve building an encrypted package containing unique data identifying the licensee and the protected software program instructions. Thus, licensees are not anonymous, and protected software is encoded with information traceable to the licensing transaction. Furthermore, by including license control data within the encrypted package, various limits may be imposed which serve to enforce the terms of the license agreement.

In general, the various embodiments involve a first distribution of a marketing shell which may contain a demonstration version of the software. The shell may contain only sample displays and advertising descriptions or, alternatively, may contain an inactive version of the complete program. However, most embodiments are envisioned to include a registration program and a special program module called a loader segment.

The marketing shell would be distributed freely by any appropriate method. If it contains a demonstration version of the program, the executive control loop will represent a limited version of the protected program. The marketing shell will prompt the prospective user to register. The registration program within the marketing shell relays registration data to a registration database computer. A unique encrypted package is assembled containing some data unique to the licensed user and an operational version of the program combined within an encrypted file. A unique decryption key is transmitted to the user's computer along with the encrypted file and any unprotected program files which may augment the marketing shell. Upon receiving the decryption key, encrypted file, and unprotected files, the marketing shell will install each of these on the user's computer.

Subsequently, each time the user executes the program, a loader segment will load and decrypt the encrypted file, as an overlay to the unprotected files, using the decryption key provided. The program will be executed in accordance with the design of the protected software program and the unique licensee data is also loaded during the program execution. When the program is not executing, the protected program remains in its encrypted form, in the mass storage of the computer along with the unprotected program files. The protected program is decrypted only when loaded for execution and may not be changed without access to the authentic encryption key.

DETAILED DESCRIPTION OF THE INVENTION

Figure 1:
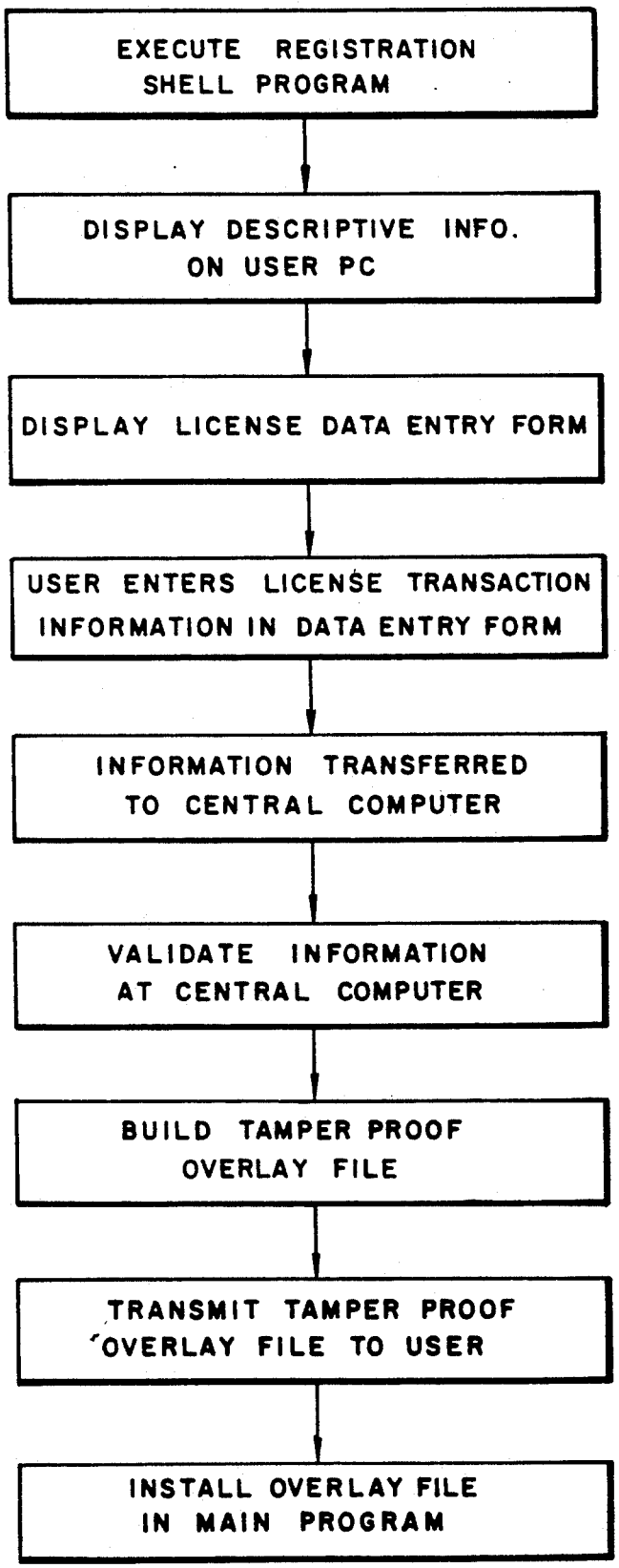
FIG. 1 is a flow diagram of the registration process according to the present invention.
Figure 2:
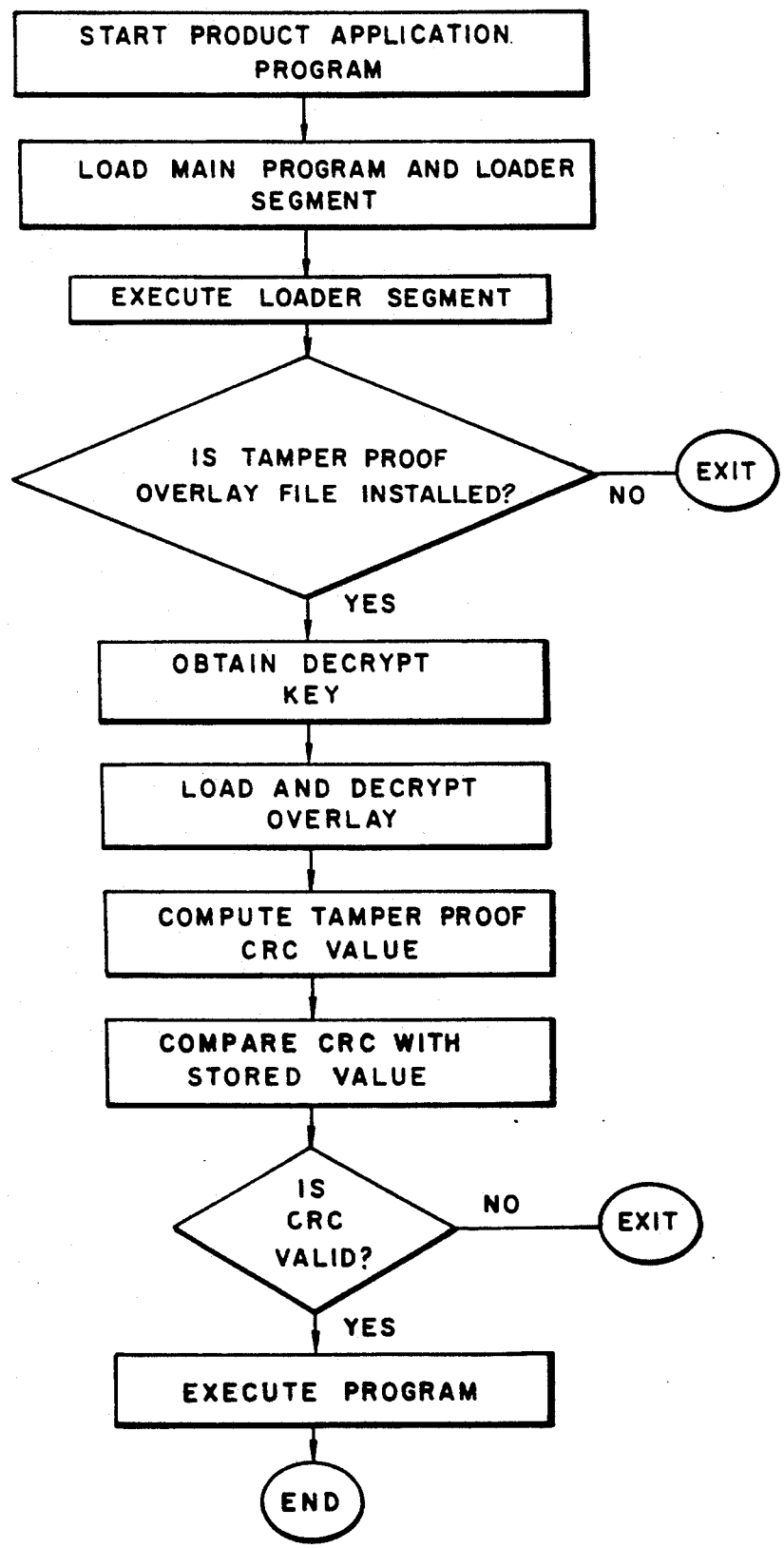
FIG. 2 is a flow diagram of the program execution process according to the present invention.
Figure 3:
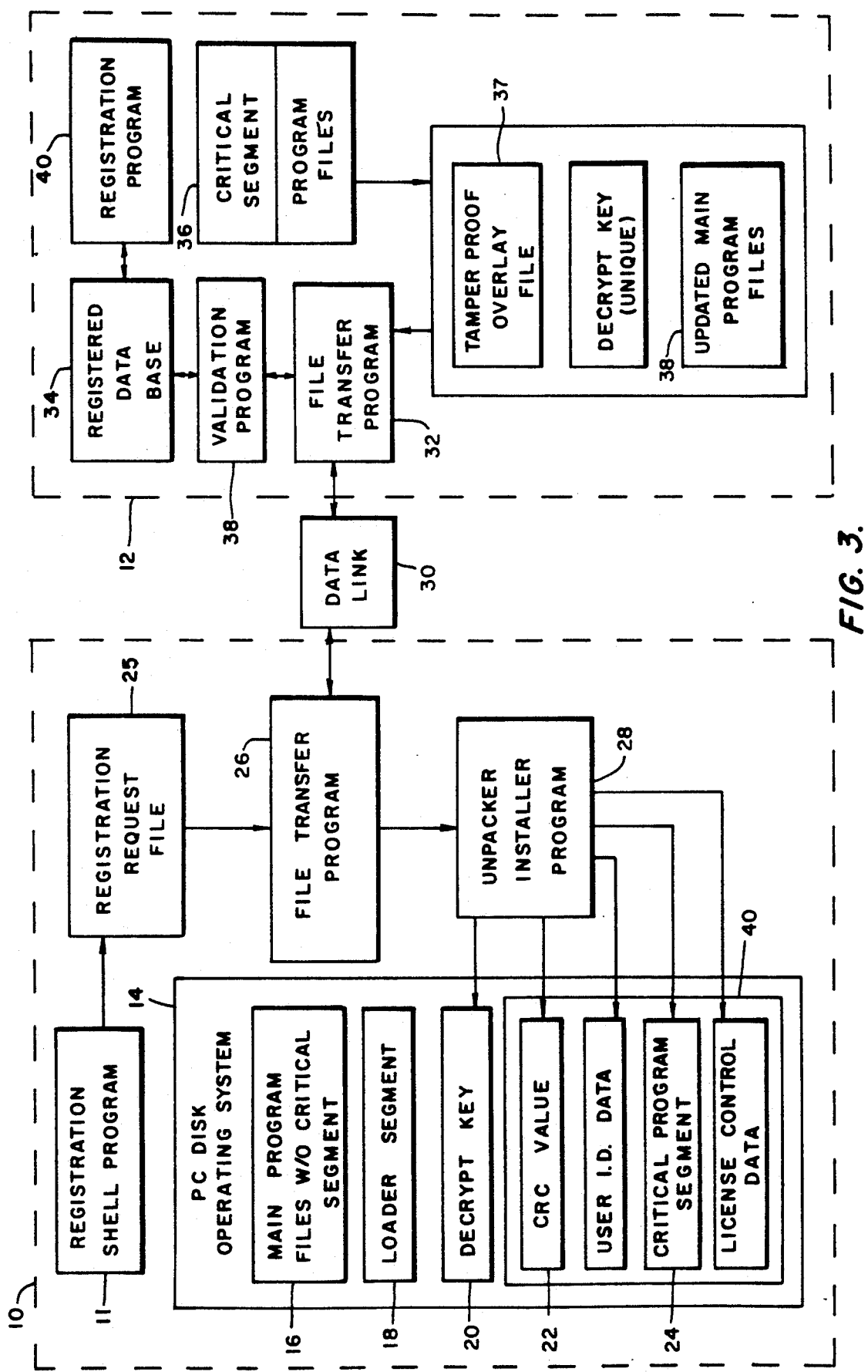
FIG. 3 is a block diagram of a typical personal computer and registration computer according to the teachings of the present invention.
Figure 4:
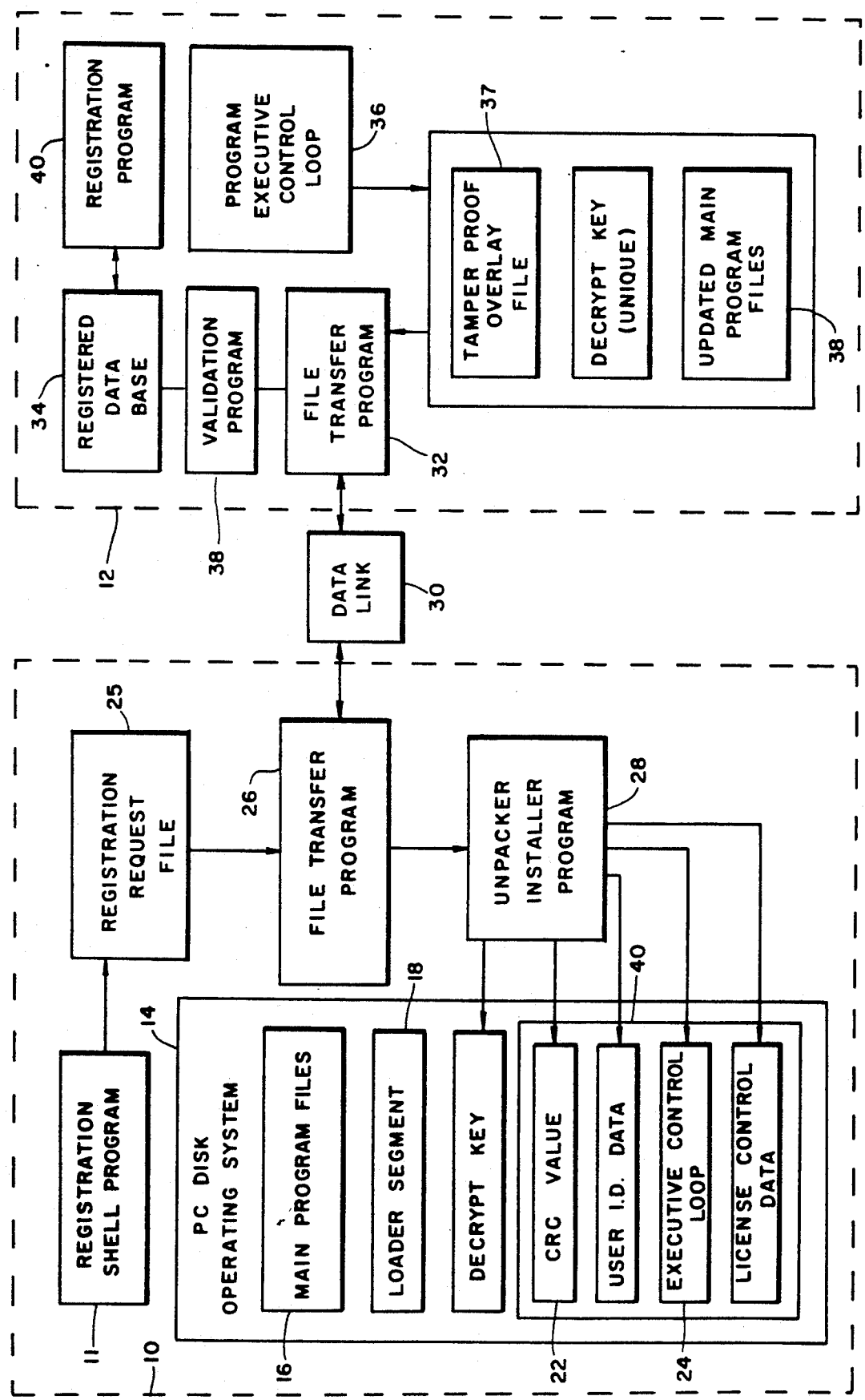
FIG. 4 is a block diagram of an alternative embodiment of a typical personal computer and registration computer according to the teachings of the present invention.

The purpose of the present invention is to allow a licensor to maintain accountability of its programs in a manner much more efficient than presently being utilized. Additionally, a second purpose of the present invention is to allow a licensee or user to test a particular program before it is purchased or licensed. Further, it is another purpose of this invention to provide a means for distributing license protected upgrades of a particular programs to registered licensees. Therefore, it is contemplated that the teachings of the present invention are considered to be comprehensive and that any software program could be distributed by this method.

In one embodiment, a particular program which is complete except for an operational executive control loop is initially provided in a personal computer or other device on a magnetic disc, firmware, hardware, or other means. Additionally, a registration shell program is also included with the particular program. However, in the case of small or extremely valuable program, the entire program may be missing and only the shell provided. Due to the exclusion of the executive control loop, the program would not operate without the implementation of the proper registration process. As shown in FIGS. I and III, this registration process is initiated utilizing a registration shell program 11 in the personal computer (PC) 10 as well as a registration program 40 provided in a registration computer 12. A registration system program is provided in the registration computer 12 and is accessible to the registration shell program 11 by an electronic data link 30. The electronic data link may be a local area network, a telephone modem link, or any other type. However, it should be noted that in a second embodiment, the registration shell and the registration system programs could be on the same medium, but separate from the product application program. In this instance, the transportable media containing the registration shell and the registration systems program are personally transported to the personal computer 10 of the user by a licensed installer, and no electronic data link is needed.

The registration shell program is executed when the user first attempts to execute the product application program provided in the main program file 16 of the PC operating system 14. The registration shell provides and displays on the PC display, descriptive information about the product application program and prompts the potential licensee to register as a user. The license could be assigned specifically for a particular licensee at a particular site and could be for varying lengths of time or on a temporary trial basis which is offered at no cost to the licensee. However, the registration shell will not attempt to execute the main program unless a tamperproof overlay file is present.

The registration shell program 11 would provide a data entry form which would be displayed on the licensee PC, requesting the licensee to provide identification information, such as a billing address, an account number and the term of the license, etc. This information is entered into a registration request file 25 which is reviewed by the licensee. The registration shell program 11 would then wait for the licensee to initiate registration by pressing a designated key. When this key is pressed, the registration file is closed and a registration shell file transfer program 26 establishes a data link with the registration system file transfer program 32. The registration program 40 in the registration computer is protected by a validation means 42 to perform a security check ensuring that the data link has been established with a legitimate registration shell. The registration shell then transmits the registration request file 25 to the registration system which would receive the file, and perform the necessary error checking and hand-shaking operation between linked file transfer programs 26 and 32. When the complete registration request file is received at the central registration computer, the registration request is validated against a database of registered users 34. The validation would involve various checks to determine if the request should be fulfilled. For example, if a second request for a temporary license is received from a particular licensee, a license would not be granted to the licensee and the executive control loop of the program would not be transmitted. If this should occur, an appropriate message would be transmitted to the registration shell for display to the potential licensee. However, if the request is validated, a record entry into the registered user database is prepared, but is not entered until the entire process is complete.

Within the registration computer 12, the user identification data is then used to build a unique tamperproof overlay file generated by merging the user identification data with executive control loop program instructions 36. A cyclic redundancy check (CRC) value is computed which is unique to the merged data and program files and included within the tamperproof overlay file 37. A unique set of encryption and decryption keys is generated and the entire contents of the tamperproof overlay file is encrypted using the encryption key. Based upon the encryption key, a decryption key is provided which is transferred along with the tamperproof overlay file. The encryption algorithm can be any technique which uses a different key for encryption and decryption similar to the public key encryption system. The registration system assembles the tamperproof overlay file and the decryption key into a single shipping file 38 for transmission to the registration shell of the personal computer. Updated main program files may also be included into the shipping file which is transmitted to the registration system of the PC by means of file transfer programs and the previously established data link.

Upon receipt of the complete shipping file, an unpacker-installer subprogram 28 in the registration shell program opens the shipping file and installs the tamperproof overlay file 40 including the executive control loop segment 24, CRC value 22, as well as the decryption key 20 and the updated main program files, if included. The electronic data link may then be disconnected since the registration process is now complete. The registration data base record is entered and billing for the licensee request may be performed by a separate program on the central registration computer 12.

After registration, the distributed product application program installed on the licensee's personal computer be activated for use by a process that uses the tamperproof overlay file and the decrypt key to load a complete product application program for execution each time the product application program is run.

This program execution process is illustrated in FIG. II. As shown therein, when the personal computer user commands the operating system to run the product application program, the operating system will load the main program and the loader segment. The loader segment will execute before any other program instructions. The loader segment then executes the activation of the product application program starting with a test for the presence of the tamperproof overlay. If no tamperproof overlay has been installed, the loader segment exits to the operating system, thus preempting the execution of the main program files. If, however, a tamperproof overlay has been installed, the loader segment finds the decryption key and proceeds to decrypt and load the tamperproof overlay, overlaying the main program files with the missing executive control loop program instructions as well as the unique identification and license control data. A cyclic redundancy check is performed during the decrypt and load process and, at completion, is compared to the cyclic redundancy check value stored in the tamperproof overlay when it was generated and transmitted by the registration computer to the PC. If the cyclic redundancy check fails, the overlay is considered to have been modified in some way, and is therefore invalid. At this point, the loader segment will unload the overlay and exit to the operating system. Therefore, as was true with respect to the non-inclusion of the tamperproof overlay, the execution of the main program files is preempted when any portion of the tamperproof overlay is modified. If the cyclic redundancy check confirms that the overlay has not been modified, the loader segment initiates the execution of the main program files with the overlay included and the product application program executes to completion.

By requiring the tamperproof overlay to be included in any operable form of the product application program, licensee identification and license control data are always included in subsequent copies of the operable program. Thus license abuse may be curtailed and monitored by the licensor.

As described with respect to FIGS. I and II, the registration process, according to the present invention, produces a tamperproof overlay file which includes executive control loop segments of a main program file and license control data. When the registration process is complete, this tamperproof overlay file is transferred from the registration computer to the personal computer. The tamperproof overlay is the key device that prevents license abuse after activation because the executive control loop program instructions may not be separated from the unique licensee identification data and license control data without detection, nor may the licensee identification and license control data be changed without detection.

The tamperproof overlay file is considered to be made tamperproof by initially storing a cyclic redundancy check value within the overlay file when the overlay file is generated. The cyclic redundancy check value is computed for the entire contents of the overlay file including program instruction and licensee data. Since licensee data is unique, each CRC will be unique. The stored CRC value is compared to the cyclic redundancy check value computed by the loader segment each time the overlay is loaded. If the cyclic redundancy check values do not agree, the loader segment will exit to the operating system. Thus, any change to the overlay file contents renders the overlay file defunct, unless a corresponding change the stored cyclic redundancy check value is also made. Secondly, the entire contents of the tamperproof overlay are encrypted by the registration system in such a manner as to obscure the location of the cyclic redundancy check value, thus making it difficult to locate and change its value. Encryption also obscures the specific program instructions contained in the tamperproof overlay and the unique user identification and license control data as well. Encryption is accomplished by any technique that uses a different key for encryption than for decryption similar to the public key encryption system. The algorithm for encryption and for generating the unique encryption key and the decryption key resides in the registration system and is therefore inaccessible to the licensee. The decryption key is transmitted to the licensee's computer through the registration system and the registration program shell. Since the algorithm for decrypting the overlay file is in the loader segment, it is possible, although difficult, to use the decrypt key and the decrypt algorithm to decrypt the overlay file and examine its contents. However, attempts to change the contents and encrypt a new, altered overlay file are hindered by a lack of access to the encryption key. It is a characteristic of the public key encryption system that only overlay files encrypted with a private encryption key may be decrypted using a public complimentary decryption key, and the private key may not easily be derived from the public key.

The tamperproof overlay file contains both the executive control loop segment of the program instructions as well as unique user identification data which is appropriate to the method and control of the license. This data would include the time period of the license, the serial number of the computer, the telephone number of the computer's modem, as well as additional information.

The loader segment 18 is a special purpose subprogram that is linked with the main program files of the product application program by a technique that renders the main program files inoperable if the loader program is removed or bypassed. The linking technique is a process that embeds certain program instructions within the main program files of the product application program. These embedded instructions test for specific values at specific memory locations unknown to the user. When the loader program segment is executed, it stores the specific values at specific memory address locations required to allow the main program files to operate. The loader program segment does this in addition to its other functions. Thus, if the loader segment is removed, or bypassed, the main program files will not contain the specific values at specific locations and are inoperable.

In another embodiment, the registration shell is distributed as part of a marketing shell package which may include an operable demonstration version of the product application program. The demonstration version of the program is designed to include the loader segment and demonstration version of the decrypt key and a demonstration version of the tamperproof overlay. In this case, the tamperproof overlay would contain no unique license data, but would contain a main program executive control loop which only demonstrates the features and displays of the registered version of the product. The demonstration version of the executive control loop has various features of the program locked out by the logical design of the executive control loop. For example, a demonstration menu that offers options may be programmed to display the options but the demonstration executive control loop would be programmed to interpret selections as a request to register the product, thus requiring registration prior to operation.

Prior to registration, the prospective licensee would execute the program and the demonstration program would be executed. As previously described and shown in FIG. II, the demonstration version of the decrypt key would be used to load, decrypt and execute the demonstration program executive control loop. After the demonstration, the prospective user would be prompted by the demonstration to register as a user and to obtain a temporary license to try the registered version of the program. The user may then register as previously described, initiating the process depicted in FIG. IV. In response to the registration request, a shipping file would be received from the registration computer which contains a new tamperproof overly file 40' and a unique decrypt key 20'. Any additional program files and updated versions of program files may also be received in the shipping file. The registration program would overwrite the demonstration versions of the tamperproof overlay 40 and decrypt key 20 with their registered versions 40' and 20'.

Subsequent to registration, when the user executes the program, the program execution process will find and load the registered version of the tamperproof overlay 40' and using the unique decrypt key 20' will decrypt and execute the registered version of the executive control loop. Thus, the demonstration package would be transformed into a fully capable registered version.

If enhanced versions of the program are available, the user may update to a more robust version of the product by invoking the same process to receive yet another decrypt key and another tamperproof overlay containing a more robust executive control loop and additional program files.

Various embodiments may employ any appropriate and ingenious techniques for using a small tamperproof overlay to control the use of large programs. Such techniques, as included herein, are merely illustrative of the potential commercial benefit of the methods disclosed herein for distributing program segments or complete programs in a form that links them with the license transaction.

Obviously, many modifications and variations of the present invention are possible in light of the above teachings. For example, it is envisioned that this invention may be implemented in a tiered architecture wherein user computers are linked to a local registration computer which is in turn linked to a regional registration computer, and so on. The registration authority of the local registration computer could be controlled by the license control data included in a transaction between the local registration computer and the regional registration computer. It is therefore to be understood that within the scope of the appended claims, the invention may be practiced otherwise than as specifically described.

What is claimed is:

1. A method of controlling the use of a program file, comprising the steps of:
   providing a program file including a loader segment and a registration shell portion to a remote computer having a display, said program file containing a first executive control program representing a limited version of said program file;
   entering license transaction information in said registration shell portion;
   transmitting said license transaction information from said registration shell to a separate registration program provided in a registration computer, said registration program merging license transaction data with a second executive control program representing a complete version of said program file to generate a unique overlay file;
   transmitting said unique overlay file from said registration program to said registration shell, said overlay file containing said second executive control program; and
   installing said overlay file in said main program file, thereby allowing complete operation of said program file only when said license transaction information is included in said overlay file.

2. The method in accordance with claim 1 further comprising the step of validating said license transaction information prior to transmitting said overlay file from said registration computer to said remote computer.

3. The method in accordance with claim 2, wherein said validating step insures that said license transaction information is provided by means of a legitimate registration shell.

4. The method in accordance with claim 1 further comprising the step of creating an overlay file which is tamperproof.

5. The method in accordance with claim 4, wherein said tamperproof overlay file is created by encrypting said tamperproof overlay file with an encryption key, providing a cyclic redundancy check value within said encrypted tamperproof overlay file and providing a decryption key to said tamperproof overlay file, said encryption and decryption keys being uniquely determined by the unique contents of the overlay file.

6. The method in accordance with claim 5, wherein a new cyclic redundancy check value is computed each time said overlay is loaded for execution and compared to the cyclic redundancy check value transmitted within said tamperproof overlay file to determine whether said overlay file has been modified since it was originally generated.

7. The method in accordance with claim 1, wherein said license transaction information and said overlay file are transmitted between said registration shell and said registration program through an electronic data link.

8. The method in accordance with claim 1, wherein said license transaction information and said overlay file are entered and installed on a single computer.

9. A system for upgrading a limited program file to a fully operational program file for a period of time comprising;
  at least one remote computer, initially provided with a first limited program file containing an overlay loader segment containing a first executive control program representing a limited version of said program file, said overlay loader segment only enabling activation of the fully operational program file when a unique overlay file is presently installed, said remote computer provided with a registration shell program, said registration shell program enabling a user to enter license transaction information, said remote computer provided with an operating system;
  a registration computer provided with a registration program, a means for receiving and processing said license transaction information, a means for creating said unique overlay file containing a second executive control program representing a complete version of said program file and at least a portion of said license transaction information, and a means for transmitting said overlay file to said remote computer; and
  means provided with said at least one remote computer for receiving said unique overlay file transmitted by said registration computer, for substituting said unique overlay file for said first limited program file and for allowing complete operation of said fully operational program file in said operating system only when said license transaction information is included in said unique overlay file.

10. The system for upgrading a limited program file to a fully operational program file in accordance with claim 9, further including an electronic data link between said remote computer and said registration computer and file transfer processes provided in both said registration computer and said remote computer.

11. The system for upgrading a limited program file to a fully operational program file in accordance with claim 9, wherein said registration computer is provided with a central data base including all registered users as well as a means for validating said license transaction information.

12. The system for upgrading a limited program file to a fully operational program file in accordance with claim 9, wherein said means for creating an overlay file is provided with an encryption key for producing a tamperproof overlay file with a cyclic redundancy check value stored therein, and a decryption key, and further wherein said decryption key is transmitted to said remote computer along with said overlay file, said encryption and decryption keys being uniquely determined by the contents of the file.

13. The system for upgrading a limited program file to a fully operational program file in accordance with claim 12, wherein said remote computer is provided with a means for decrypting said overlay file, calculating a new cyclic redundancy check value each time said overlay file is loaded for execution, and comparing this check value to the redundancy check value transmitted by said registration computer within said overlay file.

* * * * *